United States Patent [19]

Logan et al.

[11] 4,435,904

[45] Mar. 13, 1984

[54] AUTOMATED MEASURING SCALE

[75] Inventors: David J. Logan, Glastonbury; Ronald B. Webster, Ellington; Daniel J. Sullivan, Hartford, all of Conn.

[73] Assignee: Gerber Scientific Products, Inc., Manchester, Conn.

[21] Appl. No.: 346,998

[22] Filed: Feb. 8, 1982

[51] Int. Cl.³ .......................... G01B 3/20; G01B 5/02

[52] U.S. Cl. .............................. 33/143 K; 33/143 L; 33/189; 33/487

[58] Field of Search .................. 33/1 D, 1 G, 143 M, 33/143 J, 143 K, 143 L, 147 T, 147 N, 486, 487, 1 M, 125 R, 125 C, 19 A, 189, 192

[56] References Cited

U.S. PATENT DOCUMENTS

| | | | |
|---|---|---|---|
| 3,346,183 | 10/1967 | Ludwig | 33/125 R |
| 3,973,326 | 8/1976 | Gallacher et al. | 33/125 R |
| 4,035,922 | 7/1977 | von Voros | 33/143 L |
| 4,069,588 | 1/1978 | Hoppe | 33/1 M |
| 4,095,273 | 6/1978 | Gonzalez | 33/125 R |
| 4,195,348 | 3/1980 | Kakutani | 33/140 |
| 4,237,617 | 12/1980 | Goussios | 33/1 M |
| 4,246,703 | 1/1981 | Robinet | 33/1 M |
| 4,277,893 | 7/1981 | Munther | 33/1 M |
| 4,315,371 | 2/1982 | Kotani et al. | 33/125 C |
| 4,366,623 | 1/1983 | Bergqvist | 33/140 |

FOREIGN PATENT DOCUMENTS

| | | | |
|---|---|---|---|
| 1538660 | 1/1971 | Fed. Rep. of Germany | 33/1 M |
| 2720869 | 6/1978 | Fed. Rep. of Germany | 33/143 L |

*Primary Examiner*—Richard R. Stearns

*Attorney, Agent, or Firm*—McCormick, Paulding & Huber

[57] ABSTRACT

An automated measuring scale for making linear measurements includes a guide bar and an index marker that is moved automatically along the bar to predetermined positions commanded by the operator. A manually operated keyboard is provided to enter the position commands, and a digital display illustrates the commands as they are entered. The scale of movement is adjustable for an infinite number of variables, and the index marker can be repeatedly stepped along the guide bar by fixed increments when desired. In a manual mode of operation, the index marker is positioned to any location along the guide bar and the display automatically reveals the marker position in any selected scale.

15 Claims, 6 Drawing Figures

AUTOMATED MEASURING SCALE

BACKGROUND OF THE INVENTION

The present invention relates to an automated measuring scale that can be used to either measure given dimensions or to layout dimensions in a drafting process.

Electronic scaling devices which partially automate the process of making measurements that would customarily be performed manually with a ruler are known in the prior art. U.S. Pat. Nos. 4,095,273 and 4,195,348 are examples of two such prior art devices. Another U.S. Pat. No. 4,246,703 illustrates an electronic drafting device that can be conveniently attached to a commercial drafting machine to make measurements on drawings.

The prior art devices, however, are displaced or moved manually to record or layout the dimensions in question, and electronic portions of the devices determine the amount of displacement and reveal that amount in a digital or other display. With the availability of microcircuit components, the development of a fully automated measuring device that can be conveniently manipulated on drawings, charts and the like is now feasible.

It is accordingly a general object of the present invention to provide a fully automated measuring scale that responds to displacement commands and produces those commands by automatically displacing a marker index by the commanded amount.

SUMMARY OF THE INVENTION

The present invention resides in an automated measuring scale for making measurements of linear extent on drafting materials, charts and the like. The device has particular utility as a drafting instrument for laying out drawings or graphs and may be attached to a mechanical drafting machine as a base line reference guide and scaling tool.

The automated measuring scale is comprised by a base member having a linear guide for locating the scale in a measuring position in alignment with a measuring direction. An index marker is mounted on the base member and is movable back and forth on the base member in the measuring direction to identify the extent of linear measurements that can be taken from or applied to an object.

Motor means are mounted on the base member and are connected in driving relationship with the movable index marker for moving the marker precisely back and forth in the measuring direction. Control means are connected to the motor means to move the index marker by preselected amounts. Preferably, the control means include a keyboard and display through which the desired dimensions or displacements of the marker are entered. Other features such as scale factors and incremental movement of the marker are incorporated in the control means to expand the applications of the automated measuring scale.

DESCRIPTION OF THE PREFERRED EMBODIMENTS

Figure 1:
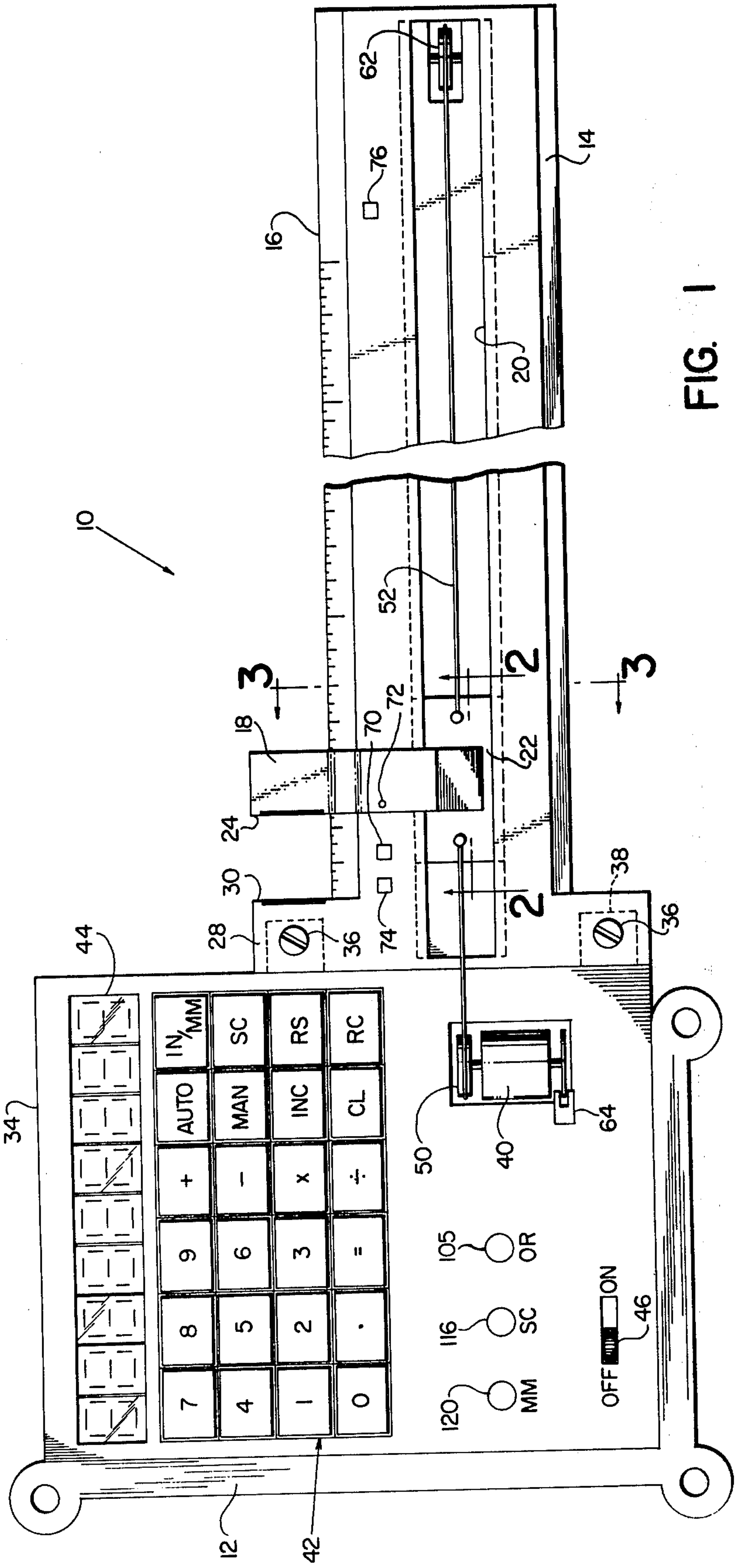
FIG. 1 illustrates in plan view one embodiment of an automated measuring scale in accordance with the present invention.

FIG. 1 illustrates an automated measuring scale, generally designated 10, for making linear measurements. The measuring scale can be used in substantially the same manner as any other scale to place dimensions on or take dimensions from a drawing or other object. The scale has particular utility as a drafting tool and includes a mounting bracket 12 for attaching the scale to a mechanical drafting machine.

The automated measuring scale 10 is comprised by a guide bar 14 bearing a straight edge 16 that serves as a base line reference guide and establishes the measuring direction. If the measuring scale is mounted on a mechanical drafting machine, the edge 16 would normally be located vertically or horizontally on a drawing and would be rotated to take measurements or lay out dimensions in any direction. The reference guide can take other forms than the edge 16 such as reference marks at each end of the bar or an embossed or printed line on a transparent base.

Figure 3:
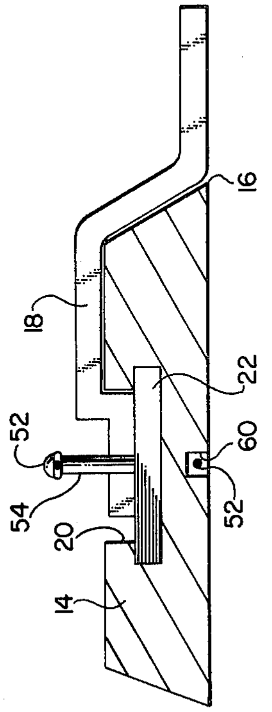
FIG. 3 is a cross sectional view of the measuring scale as seen along the sectioning line 3—3 of FIG. 1.
Figure 2:
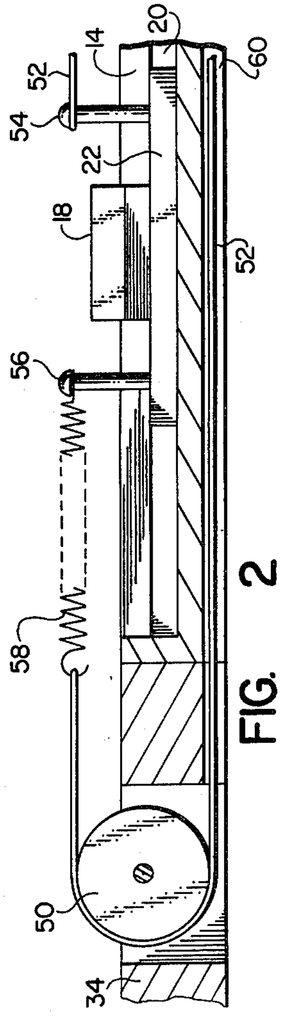
FIG. 2 is a fragmentary cross sectional view of the measuring scale as seen along the section line 2—2 in FIG. 1.

A movable index marker 18 is mounted on the guide bar 14 and is movable along the bar in the measuring direction between different stations. FIGS. 2 and 3 indicate that the upper side of the bar 14 has a T-slot 20 in which a slide 22 of the index marker is captured. The clearances between the slide and the T-slot are minimized so that the marker can slide along the slot 20 from one end of the bar to the other while the marker projects from the bar with the marking edge 24 (FIG. 1) maintained in substantially perpendicular relationship to the straight edge 16.

An origin index 28 is formed as an integral part of the bar 14 at one end and also includes a marking edge 30 perpendicular to the edge 16. The spacing between the marking edges 24 and 30 corresponds to the distance measured by the measuring scale, and the edges serve as guides for a drafting instrument to mark a drawing or other object to which dimensions are transferred from the scale.

The guide bar 14 is connected to a mounting plate or frame 34 by means of screws 36 and corresponding mounting pads 38 to form the base for the automated measuring scale. The frame 34 supports a small servomotor 40 that is connected in driving relationship with the index marker 18 and the controls for the measuring scale including a manual keyboard 42. The keyboard as illustrated consists of a plurality of numeral keys, math function keys and operating keys for controlling the various modes of operation of the automated measuring scale as described in greater detail in connection with FIG. 4. A digital display 44 is provided in conjunction with the keyboard 42 and is comprised of multiple groups of LED's or LCD's which are arranged in the conventional 7-segment configuration to generate number characters.

In addition to the servomotor 40, keyboard 42 and display 44, the mounting frame 34 also supports the on/off switch 46 for controlling power in the measuring scale. Preferably, the scale is a self-contained unit as shown and electrical power for operating the servomotor 40 and the controls is derived from a battery pack within the unit; however, an external supply may also be used.

The servomotor 40 is connected with the index marker 18 as shown in FIGS. 1 and 2 by means of a drive pulley 50 on one end of the motor shaft and a drive cable 52 which is stretched between two conecitng pins 54 and 56 on the slide 22 by means of the tensioning spring 58. The lower run of the cable 52 is located within a channel 60 cut in the bottom portion of the guide bar 14 as shown most clearly in FIG. 3, and at the outer end of the guide bar the cable is supported by an idler pulley 62.

Included on the frame 34 as part of the controls for positioning the index market 18 is an optical encoder 64 which serves as a position transducer for sensing the incremental movements of the marker by the motor 40. The encoder consists of an optical disc rotated on the end of the motor shaft opposite from the drive pulley 50 and a pair of detectors mounted in stationary relationship on the frame 34. Two trains of pulse signals in phase quadrature are produced by the detectors in conventional fashion as optically sensed indicia such as holes or transparent areas at the periphery of the disc rotate past the optical detectors. From the phased signals, both the direction and amount of marker displacement are established.

Since the encoder 64 is only capable of sensing incremental or differential movements of the marker 18 in contrast to absolute position, it is necessary, when the automated measuring scale is turned on to null or initialize the control circuits before any absolute position is indicated in the digital display 44. When power is turned on, or when the RESET key (RS) is pressed, the marker 18 is automatically driven by the motor 42 toward the origin index 28 at maximum speed. During this initialization operation, the digital display remains blank. As the marker approaches the origin index 28, a limit switch 70 detects approach of the marker shortly before it makes contact with the origin index and reduces the speed of the drive motor 40 to, for example, one inch per second. The marker then creeps toward the origin index 28 and does not strike the origin index with excessive force. Preferably, the switch 70 is a Hall effect sensor that detects a magnetic slug 72 in the marker 18 and is located within approximately $\frac{1}{4}$ inch (1 cm) of the zero position.

Another limit switch 74 detects the actual positioning of the marker 18 at the zero or nulled condition. The switch 74 may also be a Hall effect sensor which is triggered by the slug 72. When the limit switch 74 is tripped, the servomotor 40 is deenergized and the marker 18 remains in the zero position. The display 44 now indicates a zero or nulled condition.

If the marker 18 is located between the limit switches 70 and 74 when power is initially turned on, the motor 40 attempts to move the marker at high speed, but due to the ramping of the motor driver and the inertia of the system, maximum speed is not achieved before the limit switch 74 is reached.

Another limit switch 76 similar to the switch 74 is provided at the end of the guide bar 14 remote from the controls. Both switches 74 and 76 serve as protective devices in operation of the scale and deenergize the servomotor 40 when the associated limits are exceeded by the marker 18.

AUTOMATIC MODE

After the measuring scale has been initialized, the scale can be placed in an automatic mode of operation through the AUTO key on the keyboard 42. In the automatic mode of operation, the index marker 18 is driven to a commanded dimension or position along the guide bar 14 in response to commands which are entered in decimal notation through the keyboard 42 and are shown in the display 44.

Figure 4:
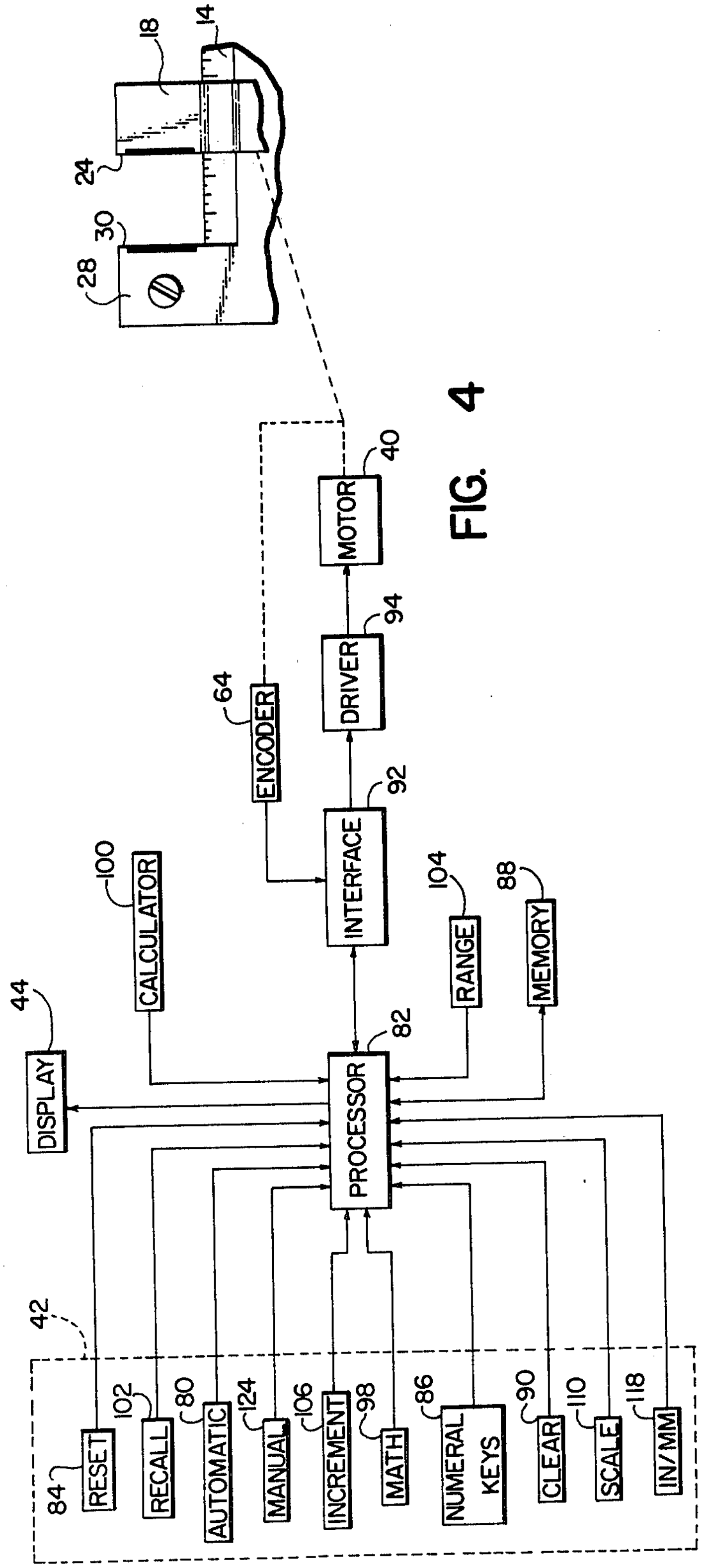
FIG. 4 is a block diagram illustrating the controls for the measuring scale.

With reference to FIG. 4, it will be observed that the AUTO key 80 on the keyboard is connected with a microprocessor 82. When the key 80 is pressed for the first time after another operating mode has been selected or after the unit is turned on, the positioning commands can be entered through the numeral keys 86 and are entered into the memory 88 and simultaneously into the digital display 44. After a command has been placed in memory, the AUTO key 80 is pressed a second time to execute the command, and the processor 82 generates a command signal which is transmitted through a command signal interface 92 to a servomotor driver 94. The driver energizes the motor 40 to move the index marker 18 along the guide bar 14, and the encoder 64 detects that movement and sends a position feedback signal to the interface in closed loop control. In one embodiment, the interface 92 is an up/down counter into which digital commands are loaded from the memory 88 by the processor 82. The pulsed feedback signals from the encoder 64 drive the counter up or down toward null depending upon the quadrature of the phased signals and the direction of marker movement. Since movement of the index marker 18 does not take place until the AUTO key 80 is pressed the second time, the displacement command can be altered and changed in memory and in the display with the CLEAR key 90 as often as desired before displacement takes place.

When the index marker 18 has moved along the guide bar 14 by a commanded amount, the spacing between the marking edge 30 on the origin index 28 and the marking edge 24 on the index marker 18 is equal to the commanded amount. The entire measuring scale thus can be positioned on a drafting paper or other object to mark or record the commanded dimension on that object. The straight edge 16 along the guide bar locates the measuring scale precisely in alignment with the measuring direction.

Further dimensioning operations can be carried out by entering new commands through the keyboard 42 and again pressing the AUTO key 80 to reposition the index marker 18 along the guide bar 14. If the measuring scale is operated from batteries, the power to the servodriver 94 may be automatically shut off within a period of time, such as five seconds, after a command has been given to conserve battery power.

The mathematical function keys 98 are also operative in the automatic mode of operation. The processor 82 is connected with caculator circuitry 100 and this circuitry responds to the numeral keys 86 and the four math function keys 98 in the manner of a standard electronic calculator. It will be understood that the index marker will not move as math functions are performed since the displacement commands are not transmitted by the processor 82 to the interface 92 until the AUTO key 80 is pressed. Consequently, a series of calculations can be performed and if the resulting number in the display represents a displacement, the AUTO key is then pressed to move the index marker 18.

A RECALL key 102 is enabled during the automatic mode of operation to reposition the index marker 18 in the last correctly commanded position. For example, if the calculator circuitry has been used and the number in the display does not represent a desired position of the index marker, the recall key can be pressed in order to reposition the marker at the last commanded position. For this reason, the memory 88 has a storage register in which each command is stored until a new command is entered. The RECALL key 102 is also useful to reposition the index marker in the event that the marker was inadvertently moved from its commanded position during the period in which servopower was off to conserve battery power.

A range circuit 104 is connected with the processor 82 to receive each of the position commands that are entered through the keyboard or result from a math calculation. This circuit determines whether the commanded position is within the range of marker displacement along the guide bar 14. If the command is within the range, the range circuit 104 permits the processor 82 to pass the command to the interface circuitry 92, but if the command is beyond the end of the range, the command is not processed and an "out-of-range" light 105 is illuminated on the front of the controls in FIG. 1 to advise the operator. The operator may then clear the command from the display with the CLEAR key 90.

INCREMENTAL ADVANCE

Figure 5:
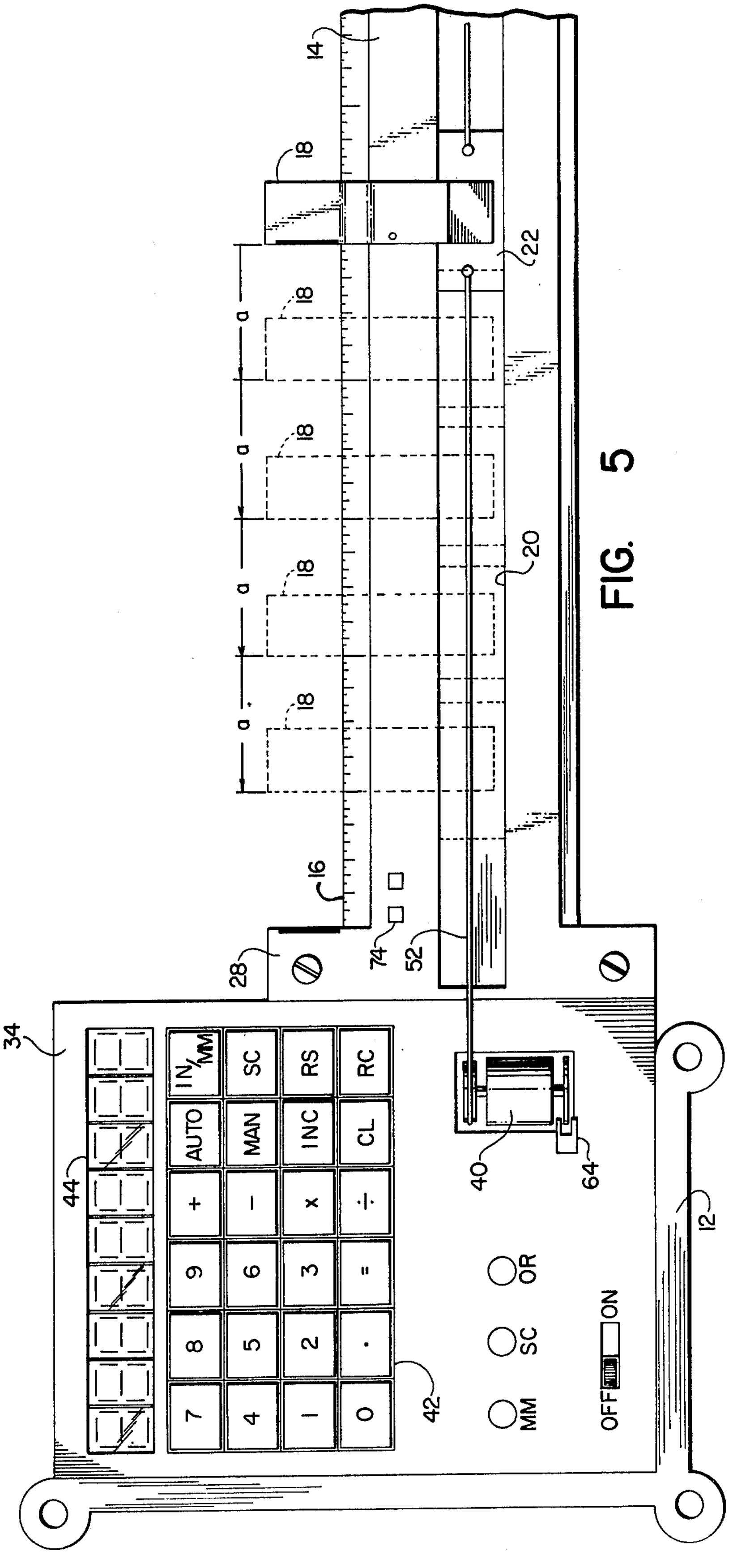
FIG. 5 is another plan view of the measuring scale illustrating the incremental movement of the marker index.

Another important feature of the automated measuring scale 10 is the INCREMENT key 106 and associated circuitry in the processor 82. These components permit the operator to successively displace the marker 18 in equal steps between spaced stations along the guide bar 18 as illustrated in FIG. 5.

The increment feature is employed by first positioning the index marker 18, manually or by the motor 40, at any location from which incremental displacements are to stepped off. The CLEAR key 90 or a zero-set key is pressed and the display is cleared to zero or a null condition. The desired increment a is then calculated or entered in memory and the display by means of the numeral keys 86 with the appropriate sign to establish the magnitude and direction in which the incremental movements of the marker will take place from the null position. The INCREMENT key 106 is then pressed and the marker 18 moves in the designated direction by the amount a from the null position to a first station along the bar 16. When the INCREMENT key is pressed another time, the displayed value remains the same, but the marker 18 moves again by the amount a to a second station. The process can be repeated as often as desired until the range circuitry 104 in FIG. 4 or the limit switches inhibit further movement of the marker 18.

The INCREMENT key is particularly useful in drafting operations to lay out equally spaced stations over a distance. The operator may first measure the distance over which the equally spaced marks are desired in the manual mode as explained in further detail below, and if necessary, he may utilize the calculator circuitry 100 to determine the increment a by which the index marker 18 is to be moved. With that value entered in the display 44, the INCREMENT key is simply pressed for the number of times desired, and the marks are rapidly located on the drafting paper as fast as the index marker is stepped.

SCALE FACTORS

The automated measuring scale 10 is capable of drafting with different scale factors. This feature is useful not only in making scaled drawings, but also in preparing graphs in which the distances represent variables other than length. The scaling feature is particularly important for drafting or plotting operations since it allows the index marker to identify dimensions which are not at full scale or represent quantities that have numerical values many times smaller or larger than actual size. Thus, the operator of the measuring scale can work with numbers that accurately represent the quantities dealt with, and not the dimensions of the representative lines on a drawing.

In the automatic mode of operation, the scale factor is entered in the processor so that all positioning commands are proportionally increased or decreased. The scale factor is entered by initially entering a position command that locates the index marker 18 at a desired scaled position along the guide bar 14. The full scale or unity value of the position is also stored in the memory 22 at the same time. Then, the SCALE key 110 in FIG. 4 is pressed and the operator enters the scaled value through the numeral keys 86. The scaled value appears in the display 44. When the SCALE key 110 is pressed a second time, the processor recognizes the scaled value in the display as the correct value for the previously located index marker and establishes a scale factor for future displacements with the aid of the calculator circuitry 100 by dividing the full scale value previously stored in the memory 22 into the displayed value. The established scale factor is retained in memory and utilized by the processor 82 until either power is turned off, a new scale factor is entered by means of the SCALE key 110 or the RESET key 84 is pressed to return the device to a unity factor. As long as a scale factor other than unity is stored in memory, a scale light 116 is illuminated on the face of the controls in FIG. 1.

A further feature of the scaling circuitry of the processor 82 includes the IN/MM key 118. A scale factor for changing the displacements of the index marker 18 from inches to millimeters is permanently programmed in the memory 88, and that factor is introduced into the commands transmitted from the processor to the servomotor 40 when the key 118 is pressed. At the same time, the MM light 120 on the face of the controls in FIG. 1 is illuminated to indicate to the operator that all further entries will be executed as millimeter displacements. In order to revert to displacements in inches, the IN/MM key 118 is merely pressed a second time, and the processor removes the programmed scaling factor from the subsequent displacement commands. The MM light 120 is simultaneously turned off

MANUAL MODE

The automated measuring scale can also be used in a manual mode of operation by means of the MANUAL key 124. In the manual mode the index marker 18 is manually positioned by the operator at any desired location along the guide bar 18 and the display 44 automatically and continuously reflects the position of the marker.

During the manual mode, the servomotor 40 is deenergized by the encoder 64 continues to supply signals to the processor 82 through the interface 92 in FIG. 4. The processor in turn updates the display 44 in accordance with the movements of the index marker 18. In the manual mode, all keyboard functions are disabled except the SCALE, AUTO, IN/MM and RESET keys.

To establish a scale other than unity in the manual mode, the index marker 18 is manually positioned to a desired station along the guide bar 14 and the location of the marker at either full value or a previously scaled value appears in the display 44. The SCALE key 110 is then pressed which enables the numeral keys, blanks the display and simultaneously stores the displayed value in a register of the memory 88. The operator then enters the new scaled value which appears in the display, and when the SCALE key is pressed a second time, the processor divides the stored value of the displacement into the new value to establish a new scaling factor. Until the RESET key 84 is pressed or another scaled value is entered, all displacements of the index marker are reflected in the display at the newly scaled value.

The IN/MM key 118 can also be used in the manual mode to reflect either inches or millimeters in the display 44.

Figure 6:
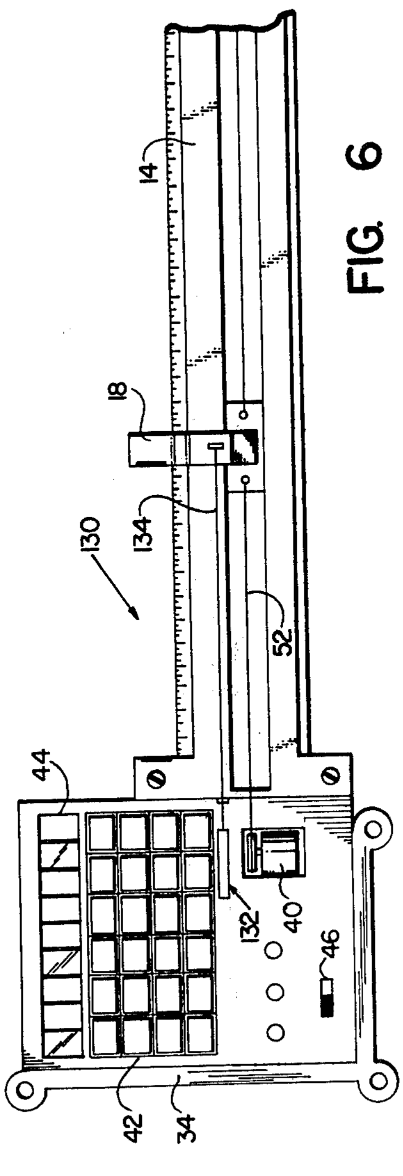
FIG. 6 illustrates in plan view another embodiment of the automated measuring scale.

FIG. 6 illustrates an alternate embodiment of the automated measuring scale, generally designated 130. In this embodiment of the scale, the basic modes of operation and the structure are substantially the same as described above except that a position transducer 132 is mounted on the frame 34 in place of the encoder 64 in the embodiment of FIG. 1. The position transducer may be comprised by a potentiometer or other device which is actuated by means of a retractable tape or cord 134 extending between the transducer and the movable marker index 18. As the marker index moves along the guide bar 14, the transducer is operated by the tape and produces a signal indicating the absolute position of the marker at all times.

The transducer 132 simplifies the structure of the controls for the scale by eliminating the initializing process which is essential for the incremental encoder 64. The electrical limit switches 74 and 76 shown in FIG. 1 may be retained if desired but the switch 70 is not needed and can be eliminated without adverse effects.

Accordingly, an automated measuring scale has been disclosed in which dimensional commands are automatically converted into precise displacements of an index marker. The scale may be used for measuring or dimensioning and has a manual mode of operation as well as an automatic mode.

While the present invention has been described in a preferred embodiment, it should be understood that numerous modifications and substitutions can be had without departing from the spirit of the invention. For example, the scaling function is not essential to the basic measuring function and can be eliminated if desired. Similarly, the mathematical calculator is not essential to the measuring function and may be eliminated. The controls described are merely exemplary of a microprocessor-based control for the scaling device, and it should be readily apparent to those skilled in the art that the controls can be embodied in numerous other forms. The index marker 18 and its mounting on the scale are merely exemplary of one form of the invention and the controls for the servomotor 40, with or without the keyboard 42, may be physically separated from the motor and guide bar 14. Accordingly, the present invention has been described in a preferred embodiment by way of illustration rather than limitation.

We claim:

1. An automated measuring scale for making measurements of linear extent in a selected measuring direction comprising:

a base having a linear guide for aligning the scale in a measuring position aligned with a selected measuring direction, and including means defining a reference position;

an index marker slidably mounted on the base and movable relative thereto toward and away from said reference position to identify linear measurements of various extent along the base in the measuring direction, said index marker including a marking guide for enabling a mark to be made on a sheet placed beneath said base;

motor means also mounted on the base and connected in driving relationship with the movable index marker for moving the marker back and forth relative to the base in the measuring direction; and control means connected with the motor means and including a command entry means having a keyboard mounted on the base for manually entering measurement commands, and processing means responsive to the measurement commands entered through the keyboard for causing the motor means to move the index marker relative to the base by commanded amounts whereby measurements of specified linear extent may be produced by movement of the index marker.

2. An automated measuring scale as defined in claim 1 wherein the control means includes sensing means mounted between the base and the index marker for sensing the movement of the marker relative to the base and providing a signal indicative of the marker movement.

3. An automated measuring scale as defined in claim 1 wherein command entry means further includes a display associated with the keyboard for indicating the command data entered through the keyboard.

4. An automated measuring scale as defined in claim 1 wherein the command entry means includes scaling means for entering from the keyboard scale factors increasing and decreasing the magnitude of the index member movements produced by the command data.

5. An automated measuring scale as defined in claim 1 wherein the control means includes incremental advance means for repeatedly moving the index marker relative to the base in a succession of steps of eual displacement and an amount commanded through the keyboard.

6. An automated measuring scale as defined in claim 1 wherein:

the control means connected with the motor means includes manually actuatable means disabling movement of the index marker by the motor means and sensing means connected with the index marker for detecting displacement of the marker irrespective of the disablement of the motor means; and a visual display is operatively connected with the sensing means and responsive to the sensing means to register the detected displacement irrespective of the disablement of the motor means whereby manual movement of the index marker relative to the base also results in registering of the detected displacement in the display.

7. An automated measuring scale as defined in claim 6 wherein:

the control means further includes scaling means for adjusting the displacement registered in the visual display by a selected scale factor.

8. An automated measuring scale as defined in claim 1 wherein the linear guide on the base is a straight edge at one side of the base.

9. An automated measuring scale as defined in claim 8 wherein the index marker comprises an element projecting from the base at said one side, and the marker includes an index marking edge disposed at a right angle to said straight edge of the base.

10. An automated measuring scale as defined in claim 9 wherein said means defining a reference position comprises a stationary origin marker fixedly mounted to the base at one end of the straight edge, and also includes an origin marking edge disposed at a right angle to the straight edge.

11. An automated measuring scale as defined in claim 1 wherein:

the control means further includes a numeral display coupled with the keyboard for displaying the numerals entered with the keys and an actuation key on the keyboard for energizing the motor means and moving the index marker to the position entered in the display.

12. An automated measuring scale as defined in claim 11 wherein the keyboard additionally includes mathematical function keys; and the processing means includes calculating means responsive to the numeral keys and the function keys for performing the mathematical functions and indicating the results in the numeral display.

13. An automated scaling device comprising:

an elongated body having a linear guide for aligning the scaling device with a measuring direction, and providing a positional reference upon which a measurement in the measuring direction is based and an index marker mounted on the body for movement along the body to different positions along the guide in the elongated direction;

the marker having an index for referencing the location of the marker to the guide at the different positions and enabling a mark to be made on a sheet placed beneath said body motor means connected with the elongated body and the index marker for driving the marker between different positions on the elongated body; and control means including command entry means connected with the motor means for energizing the motor means and moving the index marker by commanded amounts to said different positions along the elongated body, the command entry means including a manual keyboard with numeral keys for entering commands, memory means for storing the commands entered through the keyboard, and the keyboard additionally includes an execution key causing the motor means to move the index marker in accordance with the commands stored in the memory means.

14. An automated scaling device as defined in claim 13 wherein the execution key is repeatedly actuatable for stepping the index marker along the body between equally spaced positions in the elongate direction.

15. An automated scaling device as defined in claim 13 wherein the control means further includes means for moving the index marker along the body by amounts proportioned by a selected scale factor.

* * * * *